United States Patent Office 3,355,337
Patented Nov. 28, 1967

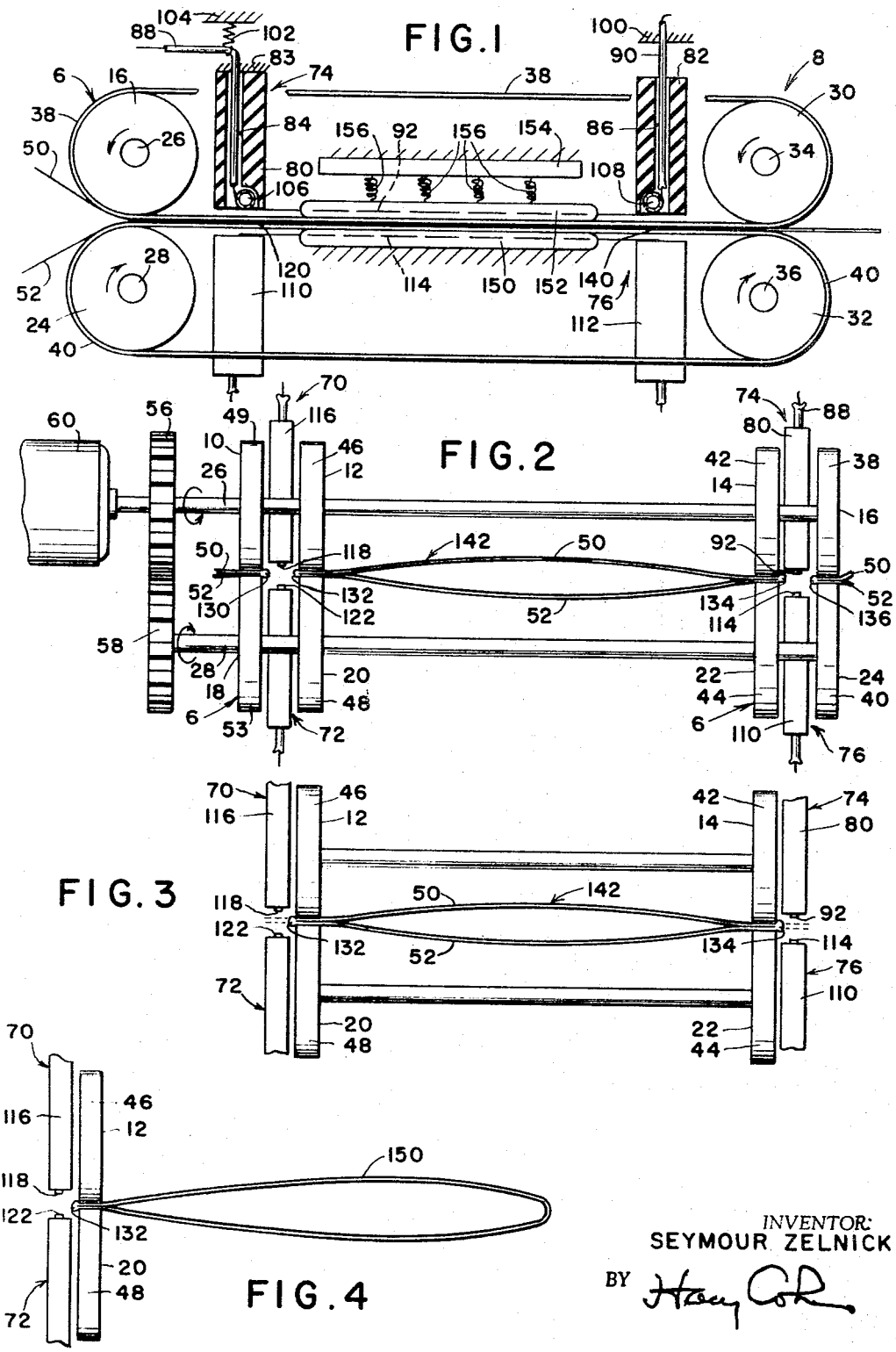

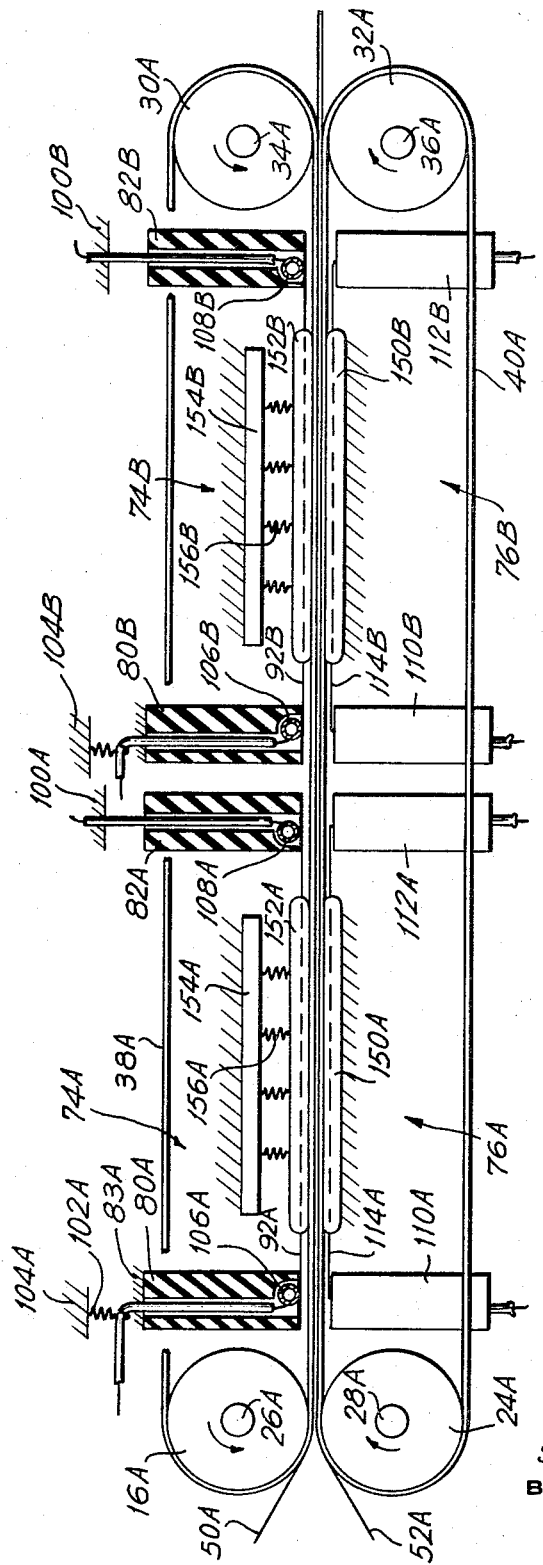

3,355,337
CONTINUOUS RADIANT HEAT SEALING AND CUTTING APPARATUS
Seymour Zelnick, Toms River, N.J., assignor to Weldotron Corporation, Newark, N.J., a corporation of New Jersey
Filed Sept. 1, 1965, Ser. No. 484,393
5 Claims. (Cl. 156—85)

This application is a continuation in part of my application S.N. 328,349, filed Dec. 5, 1963 now Patent No. 3,243,330.

This invention relates to methods and apparatuses for the radiant heat cutting and sealing of superposed webs of thermoplastic film; and more particularly, to the continuous or progressive joining of such webs.

Customarily, the webs may be sealed together to form a tube or an envelope into which an article is subsequently disposed; or an article may be initially disposed between the webs which are subsequently sealed there around.

An object of this invention is the provision of continuously or progressively formed, uniform, attractive and air-tight seals of high strength.

Another object of this invention is the provision of seals as above in webs which may be wrinkled, creased, or otherwise not perfectly planar.

Yet another object of this invention is the provision of seals at a high linear rate, or material length per unit of time.

Still another object of this invention is the provision of readily variable linear rates, whereby materials of different cutting and sealing characteristics may be advantageously sealed.

A feature of this invention is the provision of conveyor means which progressively clamp together portions of superposed webs and carry such clamped together portions adjacent a source of radiant heat which progressively melts a gap into said clamped together portion and joins together the superposed edges of the webs bounding the gap.

Another feature of this invention is the provision of a radiant heater system which is divided into a lower temperature zone and a higher temperature zone, for initially heat shrinking a portion of the superposed webs into intimate contact, and for subsequently melting and joining the preshrunk portions as they are progressively advanced relative to the heater system.

These and other objects, features and advantages of this invention will be apparent from the following detailed description thereof taken in conjunction with the accompanying drawings wherein:

FIG. 1 is a side view in elevation, with certain parts in section for the purposes of illustration;

FIG. 2 is a front view in elevation of the embodiment of FIG. 1;

FIG. 3 is a front view in elevation of a second embodiment of the invention;

FIG. 4 is a front view in elevation of a third embodiment of the invention; and

FIG. 5 is a side view in elevation of a fourth embodiment of the invention.

Referring now to FIGS. 1 and 2, a first set of rollers is generally indicated at 6 and comprises eight rollers, 10, 12, 14, 16, 18, 20, 22 and 24, respectively, of similar construction and relatively positioned as best seen in FIG. 2 by the fixed attachments thereof, in any convenient manner, to rotatable support shafts 26 and 28, respectively. A second set of eight rollers of similar construction and relative positioning, is generally indicated at 8 in FIG. 1 and is longitudinally spaced as shown from the said first roller set 6. The said second roller set comprises rollers 30 and 32 (FIG. 1), and six additional rollers which are not visible in the drawings, but which will be understood to be positioned relative to the rollers 30 and 32 in the same manner that rollers 10, 12, 14, 18, 20 and 22 are positioned relative to the rollers 16 and 24 of roller set 6. The eight rollers of the said second roller set are relatively positioned in the manner of the eight rollers of the said first roller set by the fixed attachment of the former in any convenient manner to rotatable support shafts 34 and 36, respectively, extending therebetween.

A flexible band of any material of suitably high strength, resistant to heat, and thermal conductivity—as for example but not exclusively stainless steel—extends around each longitudinally aligned pair of rollers of the respective roller sets 6 and 8. Thus, band 38 extends as shown around roller 16 of roller set 6, and longitudinally aligned roller 30 of roller set 8; while band 40 extends as shown around rollers 24 and 32 of the respective roller sets. Similarly, bands 42, 44, 46, 48, 49 and 51 extend in the same manner around rollers 14, 22, 12, 20, 10 and 18 of roller set 6 and the respective longitudinally aligned but non-illustrated rollers of roller set 8. The dimensions of the rollers and bands and the relative positioning between the latter in the vertical direction as seen in the drawings are predetermined so that adjacent band surfaces of the bands which extend around the respective longitudinally aligned roller pairs will normally be in substantial surface contact with each other in the absence of any material interposed therebetween. Thus, as seen in FIG. 1, the adjacent surfaces, i.e., those positioned longitudinally between support shafts 26 and 34, or 28 and 36, of bands 38 and 40 would normally be in substantial surface contact were it not for the interposition of layers 50 and 52 of thin film materials—described in detail hereinbelow—therebetween. The same of course holds true for bands 42 and 44, bands 46 and 48, and bands 49 and 51 as seen in FIG. 2.

All of the rollers of both roller sets 6 and 8 which are positioned above the line of surface contact, i.e., that defined by the said thin film material layers 50 and 52, between the bands 38 and 40 as seen in FIG. 1 are driven in the counter-clockwise direction at substantially the same rotational speed; while all of the rollers of both sets which are positioned below the said surface contact line are driven in the clockwise direction at substantially the same rotational speed, with said first and second mentioned rotational speeds also being substantially equal. This is accomplished by the driven rotation of support shafts 26 and 34, and 28 and 36, in a corresponding but oppositely directed manner.

Thus as seen in FIG. 2, support shafts 26 and 28 comprise substantially identically sized and intermeshed gears 56 and 58, respectively, fixedly attached thereto in any convenient manner. A variable speed motor 60, preferably but not necessarily an electric motor, is drivingly attached as shown to support shafts 26, whereby rotation of the motor to rotate shafts 26, gear 56, and rollers 10, 12, 14 and 16 in the direction indicated by the arrow drawn over the said shafts in FIG. 2, i.e., the counter-clockwise direction as seen in FIG. 1; will result, through intermeshed gear 58, in corresponding but oppositely directed rotation of gear 58, shaft 28, and rollers 18, 20, 22 and 24 in the direction indicated by the arrow drawn over shaft 28 in FIG. 2, i.e., the clockwise direction as seen in FIG. 1. Thus may be understood whereby rollers 10, 12, 14 and 16 of roller set 6 may be conveniently driven through variable speed motor 60 at a desired rotational speed in a first rotational direction, and rollers 18, 20, 22 and 24 driven at substantially the same rotational speed in the opposite direction. Frictional contact between the bands, and the respective rollers of the second roller set 8 cooperatively associated therewith, may be relied upon in well understood belt and pulley fashion to correspondingly drive the rollers of the said second roller set in a corresponding manner, as indicated by the arrows drawn on rollers 30 and 32 in FIG. 1. Alternatively, additional drive means in the nature of motor 60 and intermeshing gears 56 and 58, or any one of a wide variety of well known rotational motion translating devices of a more positive nature such as a sprocket chain arrangement, might be utilized to drive the rollers of the second roller set 8 in substantial directional and rotational speed unison with the corresponding rollers of the first roller set 6. It is also to be understood that the portions of support shafts 26, 28, 34 and 36 which extend, for example, between rollers 12 and 14, or 20 and 22, as seen in FIG. 2, may be eliminated and each resulting four roller group, for example rollers 14, 16, 22 and 24 as seen in FIG. 2, be driven independently in the manners discussed above. This may prove desirable, for example, in applications wherein relatively large containers to be packaged by a covering thereover of the thin material films 50 and 52, were sought to be conveyed concurrently with the film cutting and sealing operation through the area occupied by the said shaft portions as seen in FIG. 2.

With the respective rollers and bands driven at the same speed in any of the manners described above, it should thus become apparent that a conveyor system is formed whereby two more layers 50 and 52 of a thin film material may be simultaneously introduced in any convenient manner between the vertically aligned pairs of moving bands 49 and 53, 46 and 48, 42 and 44, and 38 and 40, at the extreme left-hand side of the apparatus as seen in FIG. 1, pressed very tightly together, and conveyed by the bands as a result of the not inconsiderable frictional forces therebetween, in an even and continuous manner from left to right as seen in FIG. 1. Alternatively, with the rollers and bands driven as above, but in the opposite directions, the two or more layers 50 and 52 could be simultaneously introduced between the said bands at the extreme right-hand side of the apparatus as seen in FIG. 1 and conveyed thereby in the same manner as above from right to left as seen in the subject figure.

Four radiant heating assemblies are indicated generally at 70, 72, 74 and 76, respectively, in FIGS. 1 and 2, with each of said assemblies positioned as shown between the bands cooperatively associated with two adjacent pairs of longitudinally aligned rollers. Thus, radiant heating assembly 74 is positioned between band 38 cooperatively associated with longitudinally aligned pair of rollers 16 and 30, and band 42 (FIG. 2) cooperatively associated with roller 14 and the non-illustrated roller longitudinally aligned therewith. Similarly, radiant heating assembly 70 is positioned between band 46 cooperatively associated with roller 12 and the non-illustrated roller longitudinally aligned therewith, and band 49 cooperatively associated with roller 10 and the non-illustrated roller longitudinally aligned therewith. Radiant heating assemblies 72 and 76 are correspondingly positioned as shown between bands 53 and 48, and bands 44 and 40, respectively (FIG. 2).

Each of the radiant heating assemblies is of similar construction and comprises two longitudinally spaced support members with an electrical heating element extending therebetween. Thus, heating assembly 74 may be seen in FIG. 1 to comprise longitudinally spaced support members 80 and 82, each of which is stationarily positioned relative to the rollers and bands in any convenient manner as indicated at 83. The support members 80 and 82 may be made of any readily available electrically insulative material of suitable strength, as for example plastic, and comprise generally vertically extending bores 84 and 86, respectively, formed therein. Insulated electrical conductors 88 and 90 extend respectively from any suitable non-illustrated voltage source into the said bores 84 and 86, and terminate therewith as shown. A thin radiant heating element 92 of any suitable metal with the requisite strength and high electrical resistance characteristics is connected as shown at opposite extremities thereof within bores 84 and 86 to the respective extremities of conductors 88 and 90, and extends longitudinally therebetween as shown in close proximity to the adjacent surfaces of bands 38 and 42 respectively. As non-limitative examples of heating element dimensions, and band, heating element and thin material spacing, which have proven satisfactory in actual practice, the said heating element 92 may be approximately .125 inch in width and approximately .040 inch in thickness, and located midway between bands 38 and 42 which are in turn spaced approximately .25 inch apart. In addition, the said element would preferably be located approximately .030 inch above the surface of the upper thin film material layer 50 conveyed between the bands 38 and 40, and 42 and 44. In practice, a substantial current is developed in the heating element 92 through conductors 88 and 90, whereby the said element will be electrically heated almost instantaneously to temperatures in the range of 1500 to 2000 degrees Fahrenheit. Such heating of the thin heating element may cause a slight expansion thereof which, if not compensated for, could disturb the orientation of the element relative to the bands and the layers 50 and 52. That is to say that the heating element 92 might expand sufficiently so that the element as seen in FIG. 1 could droop down under the force of gravity to an extent whereby undesirable— for reasons made clear in detail hereinbelow—surface contact between the element and the adjacent surface of layer 50 would result. To this effect, provision is made to maintain the heating element in a substantially taut condition during the electrical heating thereof. This may be accomplished in any convenient manner, as for example that illustrated in FIG. 1 wherein conductor 90 is maintained stationary as indicated at 100, and conductor 88 spring biased away from support member 80 by tension spring 102 connected thereto as shown, and to any convenient stationary support surface as indicated at 104. Thus the heating element will be subjected at all times to tension forces predetermined to maintain it substantially taut during the aforementioned high temperature heating thereof. Means may be provided to insure that such tensioning of the heating element does not result in a breaking thereof, and may take the form of guide rollers 106 and 108 rotatably positioned as shown within the respective support member bores 84 and 86. Thus, with the said heating element guided as shown around the said rollers, no sharp corners are presented thereto and the element enable to move freely, upon the expansion thereof, toward tension spring 102 without an undesirable build up of tensile stresses in any portion thereof, i.e., a portion which experiences a maximum directional change.

Heating assemblies 76, 70 and 72 are of the same construction as heating assembly 74; with heating assembly 76 comprising support posts 110 and 112 (FIG. 1) with heating element 114 extending therebetween, heating assembly 70 comprising support post 116, and a non-illustrated support post longitudinally spaced therefrom, with heating element 118 extending therebetween; and heating assembly 72 comprising support post 120, and a non-illustrated support post longitudinally spaced therefrom, with heating element 122 extending therebetween. The spacing of the heating elements 114, 118 and 122 relative to the respective bands adjacent thereto and the upper and lower thin film material layers 50 and 52 are all approximately the same as the corresponding spacing of heating element 92 relative to the said bands and material layers. Thus, heating element 118 is spaced midway between bands 46 and 49, which are in turn spaced approximately .25 inch apart, and is spaced approximately .030 inch above the adjacent surface of upper material film 50. Heating elements 122 and 114 and bands 53 and 48, and 44 and 40, are relatively positioned in the same manner with the said heating elements also each being spaced approximately .030 inch below the adjacent surface of lower layer 52.

In the operation of the embodiment of FIGS. 1 and 2, the layers 50 and 52 might preferably constitute thin films of an oriented, thermoplastic material such as propylene, which material currently finds widespread utilization in the attractive and inexpensive packaging of merchandise. By oriented is meant that the plastic has been pre-stretched whereby it will shrink at a relatively uniform rate upon the application of high temperature heat thereto. At the commencement of such operation, the respective heating elements 92, 114, 118 and 122 are energized in the manner described above to come almost instantaneously to the aforementioned high operating temperatures thereof. Variable speed drive motor 60 is then energized to drive the rollers and bands as above in the direction indicated by the arrows in FIG. 1 at a speed commensurate with the thickness and thermo-setting characteristics of the thin film material layers 50 and 52, and the operating temperature of the heating elements. The two layers 50 and 52 are then fed as indicated, in any convenient manner, between the moving bands for conveyance thereby from left to right as seen in the subject figure. As the now tightly compressed layers 50 and 52 reach the position indicated at 120 in FIG. 1 whereat the said layers are first between, though not in surface contact with, the respective heating elements 92 and 114, and 118 and 122, the considerable heat radiated from the latter will commence the melting of the portions of the layers now situated therebetween. Continued application of this radiant heat to the said portions as the latter are conveyed between the heating elements will result in the melting of the former away from the heating elements toward the adjacent surfaces of the bands. Through the desirable, though not essential use of oriented plastic for the thin film material layers, this melting will progress at a uniform rate toward the bands. As the said layers melt, a plurality of beads 130, 132, 134, and 136 (FIG. 2) are formed by the melted plastic, which beads, of course, also progress toward the bands. As the respective beads reach the bands, the new substantially melted portions of the layers should just be reaching the position thereof indicated at 140 in FIG. 1 immediately between the ends of the effective portions of the respective heating elements, whereby no further melting of the former will occur. In addition, the preferably high thermal conductivity of the bands will function to inhibit further melting of the layers as the said beads reach the said bands by the conduction of sufficient heat away from the beads and the portions of the layers tightly gripped between the bands. Thus may be understood whereby is formed, on a continuous basis limited only by the lengths of the thin film material layers 50 and 52, a long continuous tube of the said layers, indicated generally at 142 in FIG. 2, bounded on each side by air-tight beads 132 and 134 of uniform appearance and considerable strength.

The small portions of layers 50 and 52 which include beads 130 and 136 may be passed to waste in any convenient manner. Alternatively, one or more additional sets of rollers, bands, and heating elements might be arranged to the right hand side of the apparatus as seen in FIG. 2, the said further sets of rollers and bands driven from extensions of support shafts 26, 28, 34 and 36, or in any other convenient manner as discussed hereinabove, and one or more additional continuous tubes formed thereby. In such case, bead 136 would, of course, form the bead for the left side of the first of such additional tubes.

Since the speed of drive motor 60, and thus of the rollers and bands is variable, the operational cutting and sealing speed of the apparatus would also be variable. To this effect, non-illustrated means are provided to vary the voltage supplied across the conductors which are connected as described to the respective heating elements 92, 118, 122 and 114, whereby the operational temperatures of the latter may be varied accordingly. Thus, the operational temperatures of the said elements may be raised to permit faster operational speeds of the rollers and bands, and attendant increase in the length of tubing formed per unit time. Too, any significant increase in the thicknesses of the respective thin film material layers 50 and 52, or the temperature required to accomplish the melting thereof in the desired manner, may thus be compensated for by increasing the operational temperatures of the heating elements and thus not require any reduction in the operational speed of the rollers and bands.

The embodiment of FIG. 3 is substantially identical to the embodiment of FIG. 2, with the exception that the outer longitudinally aligned pairs of bands and rollers have been eliminated therefrom as shown. Apparatus of this construction would be particularly adaptable in cases wherein no cutting of the material layers 50 and 52, and scrapless sealing thereof was desired. As indicated by the dashed lines in the subject figure, the widths of the material layers 50 and 52 are predetermined so that the edges thereof extend just to the region intermediate heating elements 118 and 122, and 92 and 114. Thus, upon the radiant heat melting of the said edges only beads 132 and 134 will be formed thereat for progressive movement toward the adjacent band surfaces, whereby no scrap material will remain after formation of the tube 142.

In the embodiment of FIG. 4, the number of bands and rollers, as well as the number of heating elements, is even further reduced to the depicted extent, whereby all that remain are one set of bands, i.e., 46 and 48, and one set of heating elements, i.e., 70 and 72. Apparatus of this construction would be particularly adaptable to the scrapless formation of a continuous tube 150 from a single, folded over layer 50 of thin film material as made clear in the drawing.

The upper run of each lower conveyor band in each form of the invention is supported by a longitudinally extending stationary support 150 over which the band moves, and a movable pressure bar 152 extends longitudinally of the lower runs of each upper conveyor band so that the superimposed film plies are tightly clamped between companion bands while being conveyed longitudinally of the heating elements. Pressure bar 152 is pressed by the compression springs 156 interposed between said bar and stationary support 154.

The two zone heating system is illustrated in FIG. 5. In commercial operations, the webs may be wrinkled, and thus not in intimate contact with each other although clamped between the upper and lower conveyor bands. In view of this, the portions of the radiant heating elements which are initially exposed to the progressively advancing, peripherally clamped portions of the webs are operated at a temperature which will shrink the portion of the webs clamped between the bands and passing therebetween into intimate contact with each other, but which temperature will not melt a gap through the webs. The portions of the radiant heating elements which are subsequently exposed to the now shrunk, clamped portions of the webs are operated at a temperature which will melt a gap into these portions of the webs and will join the edges of the superposed webs bounding this gap.

The structure of FIG. 5 is similar to that shown in FIG. 1. The heating assemblies have been duplicated to provide a first set of heating assemblies 74A and 76A which may be operated at a relatively lower temperature and a second set of heating assemblies 74B and 76B which may be operated at a relatively higher temperature. Similar structure is shown by similar reference numerals.

The upper right conveyor band 38A passes around two rollers 16A and 30A respectively, which are fixed to two shafts 26A and 34A respectively. The lower right conveyor band 40A passes around two rollers 24A and 36A respectively, which are fixed to two shafts 28A and 36A. A similar set of upper left and lower left conveyor bands, not shown, are provided as indicated in FIG. 2.

The upper and lower superposed webs of thermoplastic film 50A and 52B respectively, enter the nip of the conveyor bands as they pass around the rollers 16A and 24A, are seized and clamped by the bands, and carried along until they are discharged from the bands as they pass around the rollers 30A and 32A.

An initial upper heating assembly 74A is disposed between the left and right sets of bands adjacent the roller 16A. This heating assembly comprises a heating element 92A which passes around two guide rollers 106A and 108A which are mounted to two insulator brackets 80A and 82A respectively which are fixed to a support 83A. One end of the element is fixedly mounted to a support 100A, while the other end is mounted to a support 104A by a tension spring 102, whereby the element is held taut despite any thermal expansion thereof.

An initial lower heating assembly 76A similarly includes a heating element 114A which is tautly mounted between two insulator brackets 110A and 112A.

The subsequent upper heating assembly 74B and the subsequent lower heating assembly 76B are disposed between the heating assemblies 74A, 76A and the rollers 30A and 32A, and are otherwise identical to those heating assemblies.

The lower run of the upper right belt 38A is in alignment and substantial abutment with the upper run of the lower right belt 40A. These runs are initially biased together to clamp the webs 50A and 52A therebetween by an initial upper pressure bar 152A and an initial lower pressure bar 150A. These runs are subsequently biased together by a subsequent upper pressure bar 152B and a subsequent lower pressure bar 150B. Advantageously, the two upper bars may be made integral and the two lower bars may be made integral, to provide a longer clamping length. The lower bars 150A and 150B are fixedly mounted. The upper bars 156A and 156B are mounted to supports 154A and 154B respectively and biased downwardly by a plurality of compression springs 156A and 156B respectively.

This application is related in subject matter to my application Ser. No. 263,837, filed Mar. 8, 1963, and assigned to the assignee of my present application. Also it will be understood that the present invention involving continuous longitudinal sealing techniques may be utilized in packaging machines for providing the seals of the wrapping films at the opposite sides of the packages, for example but without limitation, in packaging machines disclosed in my assignee's United States patent application, Ser. No. 187,699, filed Apr. 16, 1962, for the invention of Seymour Zelnick et al.

While I have shown and described the preferred embodiment of the invention, it will be understood that the invention may be embodied otherwise than as herein specifically illustrated or described and that certain changes in the form and arrangement of parts and in the specific manner of practicing the invention may be made without departing from the underlying idea or principles of this invention within the scope of the appended claims.

What is claimed is:

1. Apparatus for the radiant heat melting and sealing of superposed webs of thermoplastic material comprising: a first source of radiant heat of a temperature operable to shrink but not melt the webs, and a second source of radiant heat of a temperature operable to melt the webs; first and second longitudinally extending conveying means operable to press said webs firmly together and to progressively convey the pressed together webs initially adjacent said first source of heat whereby the webs are progressively shrunk into intimate contact together, and subsequently adjacent said second source of heat whereby a longitudinal gap is progressively melted through the webs and the edges of the superposed webs bounding the gap are joined together.

2. Apparatus for the radiant heat melting and sealing of superposed webs of thermoplastic material comprising: a left upper horizontally extending conveyor belt; a left lower horizontally extending conveyor belt; a right upper horizontally extending belt; a right lower horizontally extending conveyor belt; the lower run of said left upper belt being in vertical alignment and in abutment with the upper run of said left lower belt; the lower run of said right upper belt being in vertical alignment and in abutment with the upper run of said right upper belt; said runs having a common plane of abutment; whereby said belts are operable to progressively receive therebetween two superposed horizontal webs, to progressively clamp a longitudinally extending portion of the webs therebetween, and to progressively convey said clamped portion; a first radiant heating means disposed between said left and right sets of belts adjacent the plane of abutment, operating at a relatively lower temperature operable to progressively shrink but not melt the portions of the web thereadjacent; a second radiant heating means disposed between said left and right sets of belts adjacent the plane of abutment, operating at a relatively higher temperature operable to progressively melt a gap into the portions of the web thereadjacent, and to join the superposed edges of the webs bounding the gap; said belts progressively conveying the clamped portions of the webs initially adjacent said first heating means and subsequently adjacent said second heating means.

3. Apparatus according to claim 2 wherein said first radiant heating means comprises an upper, elongated, electrically powered, heating element tautly supported above said plane of abutment, and a lower, elongated, electrically powered, heating element tautly supported below said plane of abutment; and said second radiant heating means comprises an upper, elongated, electrically powered, heating element tautly supported above said plane of abutment, and a lower, elongated, electrically powered, heating element tautly supported below said plane of abutment.

4. A method of progressively sealing together two superposed webs of heat-shrinkable thermoplastic material, comprising progressively clamping together two superposed portions of the webs and progressively conveying the clamped together portions initially adjacent a relatively low temperature radiant heat source to progressively shrink but not melt the clamped together portions into intimate contact with each other and subsequently adjacent a relatively high temperature radiant heat source to progressively melt a gap into the shrunk portions and to join together the superposed edges of the webs bounding the gap.

5. A method of progressively sealing together two superposed webs of heat-shrinkable thermoplastic material, comprising progressively clamping together the marginal subportions of two superposed portions of the webs between two spaced apart sets of clamping means and progressively conveying the peripherally clamped together portions initially adjacent a relatively low temperature radiant heat source to progressively shrink but not melt clamped together portions into intimate contact with each other and subsequently adjacent a relatively high temperature radiant heat source to progressively melt a gap into the shrunk portions and to join together the superposed edges of the webs bounding the gap.

References Cited

UNITED STATES PATENTS

| | | | |
|---|---|---|---|
| 3,087,845 | 4/1963 | Patterson | 156—306 |
| 3,131,623 | 5/1964 | Seefluth | 156—583 |
| 3,142,608 | 7/1964 | Techtmann et al. | 156—583 |
| 3,218,961 | 11/1965 | Kraft et al. | 156—583 |

D. J. DRUMMOND, *Primary Examiner.*

EARL M. BERGERT, *Examiner.*